US011276060B2

(12) United States Patent
Qi

(10) Patent No.: US 11,276,060 B2
(45) Date of Patent: *Mar. 15, 2022

(54) TRANSFERRING OPERATIONS BASED ON BLOCKCHAIN SMART CONTRACT

(71) Applicant: Advanced New Technologies Co., Ltd., Grand Cayman (KY)

(72) Inventor: Yitong Qi, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 16/938,042

(22) Filed: Jul. 24, 2020

(65) Prior Publication Data
US 2020/0364704 A1 Nov. 19, 2020

Related U.S. Application Data

(63) Continuation of application No. 16/785,451, filed on Feb. 7, 2020, now abandoned, which is a continuation
(Continued)

(30) Foreign Application Priority Data

Jun. 28, 2019 (CN) .......................... 201910577032.0

(51) Int. Cl.
G06Q 20/38 (2012.01)
(52) U.S. Cl.
CPC ....... G06Q 20/389 (2013.01); G06Q 20/3829 (2013.01); G06Q 2220/00 (2013.01)
(58) Field of Classification Search
CPC ............. G06Q 10/06; G06Q 20/38215; G06Q 30/0223; G06Q 20/3829; G06Q 20/12;
(Continued)

(56) References Cited

U.S. PATENT DOCUMENTS 5,895,457 A * 4/1999 Kurowski ............... G07F 9/002
705/413
9,374,370 B1 6/2016 Bent, II et al.
(Continued)

FOREIGN PATENT DOCUMENTS

CN 106651331 5/2017
CN 106548330 3/2018
(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.
(Continued)

*Primary Examiner* — Johann Y Choo
(74) *Attorney, Agent, or Firm* — Fish & Richardson P.C.

(57) ABSTRACT

Implementations of this specification provide a system and method for performing transfer operations based on a blockchain smart contract. An example method includes: determining, by a transferor client device, a transferee account, a transfer amount, and at least one expense asset, and constructing and submitting a transfer transaction to a blockchain network. The transfer transaction is verified by the blockchain network through a smart contract, using a homomorphic encryption algorithm to determine that a sum of a transfer amount included in a transfer asset and a change amount included in a change asset is equal to a total expense amount corresponding to the at least one expense asset. Using the smart contract, the expense asset is deducted from a transferor account associated with the transferor client device, the change asset is added to the transferor account, and the transfer asset is added to the transferee account.

18 Claims, 9 Drawing Sheets

Related U.S. Application Data of application No. PCT/CN2020/072034, filed on Jan. 14, 2020.

(58) Field of Classification Search
CPC .. G06Q 20/389; G06Q 2220/00; G06Q 20/10; G06Q 20/02
See application file for complete search history.

(56) References Cited

U.S. PATENT DOCUMENTS

| | | | |
|---|---|---|---|
| 10,680,800 B2* | 6/2020 | Zhang | H04L 63/123 |
| 2005/0240526 A1* | 10/2005 | Hill | G06Q 20/14 |
| | | | 705/40 |
| 2013/0211895 A1* | 8/2013 | Chase | G06Q 20/34 |
| | | | 705/14.17 |
| 2015/0262183 A1 | 9/2015 | Gervais et al. | |
| 2015/0379510 A1 | 12/2015 | Smith | |
| 2016/0048817 A1* | 2/2016 | Koeppel | G07F 19/203 |
| | | | 705/43 |
| 2016/0342976 A1* | 11/2016 | Davis | G06Q 20/065 |
| 2018/0121918 A1* | 5/2018 | Higgins | G06Q 20/02 |
| 2018/0337820 A1* | 11/2018 | Chen | H04L 67/10 |
| 2019/0158270 A1 | 5/2019 | Berti | |
| 2019/0164153 A1 | 5/2019 | Agrawal et al. | |
| 2019/0251270 A1* | 8/2019 | Liu | H04L 63/123 |
| 2020/0042999 A1* | 2/2020 | Zhang | G06Q 20/02 |
| 2020/0151687 A1* | 5/2020 | Bhasin | G07F 5/24 |
| 2020/0153628 A1* | 5/2020 | Sakai | H04L 9/30 |
| 2020/0193419 A1* | 6/2020 | Lin | H04L 9/008 |

FOREIGN PATENT DOCUMENTS

| | | |
|---|---|---|
| CN | 108764874 | 11/2018 |
| CN | 108764875 | 11/2018 |
| CN | 108830716 | 11/2018 |
| CN | 109102389 | 12/2018 |
| CN | 109377215 | 2/2019 |
| CN | 109903026 | 6/2019 |
| CN | 110348837 | 10/2019 |
| TW | 201909084 | 3/2019 |

OTHER PUBLICATIONS

Nakamoto, "Bitcoin: A Peer-to-Peer Electronic Cash System," www.bitcoin.org, 2005, 9 pages.

Wang et al., "Research on Transaction and Security Based on Blockchain Technology," Netinfo Security, May 2019, 5:1-9 (with English abstract).

PCT International Search Report and Written Opinion in International Application No. PCT/CN2020/072034, dated Apr. 13, 2020, 11 pages (with partial English translation).

\* cited by examiner

TRANSFERRING OPERATIONS BASED ON BLOCKCHAIN SMART CONTRACT

CROSS-REFERENCE TO RELATED APPLICATIONS

This application is a continuation of U.S. patent application Ser. No. 16/785,451, filed on Feb. 7, 2020, which is a continuation of PCT Application No. PCT/CN2020/072034, filed on Jan. 14, 2020, which claims priority to Chinese Patent Application No. 201910577032.0, filed on Jun. 28, 2019, and each application is hereby incorporated by reference in its entirety.

TECHNICAL FIELD

One or more embodiments of the present disclosure relate to the field of information technology, and in particular, to a transferring method and a transferring system based on a blockchain smart contract.

BACKGROUND

It is well known that at present, users can register accounts on a blockchain network, and users can transfer between their accounts.

In some instances, to perform a transfer from account A (a transferor) to account B (the transferee), account A first constructs a transfer transaction containing a transfer amount and an account identifier of account B. Then, the transfer transaction is broadcast to each node in a blockchain network. After each node has verified the transfer transaction, each node executes the transfer transaction and writes the transfer amount into account B.

However, under conventional blockchain-based transfer schemes, the account balance and transfer amount of the user may be exposed to each node in the blockchain network, which may not protect the privacy of the user.

SUMMARY

In order to avoid exposing the of the user's account balance and transfer amount to each node in the blockchain network and protect the privacy of the user, the embodiments of the present disclosure provide a transferring method and a transferring system based on a blockchain smart contract. The technical solution is as follows.

According to a first aspect of the embodiments of the present disclosure, there is provided a transferring method based on a blockchain smart contract. In some embodiments, a smart contract is deployed in the blockchain network. The smart contract is used to manage assets owned by each account and to implement transfers between accounts. For any asset, the asset contains an encrypted amount E (v), and the encrypted amount is obtained by encrypting an amount v corresponding to the asset with a public key of the account that owns the asset.

The transferring method includes: determining, by a transferor client logged in with a transferor account, a transferee account, a transfer amount, and at least one expense asset; creating, by the transferor client, a change asset and a transfer asset based on the transfer amount and an amount corresponding to the at least one expense asset, wherein the encrypted amount contained in the change asset is obtained by encrypting the amount corresponding to the change asset with the public key of the transferor account, and the encrypted amount contained in the transfer asset is obtained by encrypting the amount corresponding to the transfer asset with the public key of the transferee account; and constructing and submitting, by the transferor client, a transfer transaction to the blockchain network, wherein the transfer transaction includes an account identifier of the transferee account, the transfer asset, the change asset, and the at least one expense asset; verifying, by the blockchain network, the transfer transaction using the smart contract, wherein verifying the transfer transaction includes: determining, based on a homomorphic encryption algorithm, whether the sum of the amount corresponding to the transfer asset and the amount corresponding to the change asset is equal to the amount corresponding to the at least one expense asset; and if determining that the verification is successful, by the blockchain network, deducting the at least one expense asset from the transferor account, adding the change asset to the transferor account, and adding the transfer asset to the transferee account using the smart contract.

According to a second aspect of the embodiments of the present disclosure, there is provided a transferring method based on a blockchain smart contract. In some embodiments, a smart contract is deployed in the blockchain network. The smart contract is used to manage assets owned by each account and to implement transfers between accounts. For any asset, the asset contains an encrypted amount E (v), and the encrypted amount is obtained by encrypting an amount v corresponding to the asset with a public key of the account that owns the asset.

The transferring method includes: determining, by a transferor client logged in with a transferor account, a transferee account, a transfer amount, and at least one expense asset; creating, by the transferor client, a change asset and a transfer asset based on the transfer amount and an amount corresponding to the at least one expense asset, wherein the encrypted amount contained in the change asset is obtained by encrypting the amount corresponding to the change asset with the public key of the transferor account, and the encrypted amount contained in the transfer asset is obtained by encrypting the amount corresponding to the transfer asset with the public key of the transferee account; and specifying, by the transferor client, N other transferee accounts, and creating N other transfer assets that correspond to the N other transferee accounts in a one-to-one manner, wherein for each other transfer asset, the encrypted amount contained in the other transfer asset is obtained by encrypting zero with the public key of the corresponding other transferee account; constructing and submitting, by the transferor client, a transfer transaction to the blockchain network, wherein the transfer transaction includes an account identifier of the transferee account, the transfer asset, the change asset, the at least one expense asset, account identifiers of the N other transferee accounts, the N other transfer assets, a correspondence between the transferee account and the transfer asset, and the one-to-one correspondence between the N other transferee accounts and the N other transfer assets; verifying, by the blockchain network, the transfer transaction using the smart contract, wherein verifying the transfer transaction includes: determining, based on a homomorphic encryption algorithm, whether the sum of the amount corresponding to the transfer asset, the amount corresponding to the change asset and the amount corresponding to the N other transfer assets is equal to the amount corresponding to the at least one expense asset; and if determining that the verification is successful, by the blockchain network, deducting the at least one expense asset from the transferor account using the smart contract, adding the change asset to the transferor account using the smart contract, adding the transfer asset to the transferee account using the smart contract, and adding corresponding other transfer asset to each other transferee account using the smart contract.

According to a third aspect of the embodiments of the present disclosure, there is provided a transferring system based on a blockchain smart contract, including a blockchain network and a transferor client logged in with a transferor account.

In some embodiments, a smart contract is deployed in the blockchain network, the smart contract is used to manage assets owned by each account and to implement transfers between accounts. For any asset, the asset contains an encrypted amount E (v), and the encrypted amount is obtained by encrypting an amount v corresponding to the asset with a public key of the account that owns the asset.

The transferor client is configured to: determine a transferee account, a transfer amount, and at least one expense asset; and create a change asset and a transfer asset based on the transfer amount and an amount corresponding to the at least one expense asset, wherein the encrypted amount contained in the change asset is obtained by encrypting the amount corresponding to the change asset with the public key of the transferor account, the encrypted amount contained in the transfer asset is obtained by encrypting the amount corresponding to the transfer asset with the public key of the transferee account; and construct a transfer transaction and submit the transfer transaction to the blockchain network, wherein the transfer transaction includes an account identifier of the transferee account, the transfer asset, the change asset, and the at least one expense asset.

The blockchain network is configured to: verify the transfer transaction using the smart contract, wherein verifying the transfer transaction includes: determining, based on a homomorphic encryption algorithm, whether the sum of the amount corresponding to the transfer asset and the amount corresponding to the change asset is equal to the amount corresponding to the at least one expense asset; and if determining that the verification is successful, deduct the at least one expense asset from the transferor account, add the change asset to the transferor account, and add the transfer asset to the transferee account using the smart contract.

According to a fourth aspect of the embodiments of the present disclosure, there is provided a transferring system based on a blockchain smart contract, including a blockchain network and a transferor client logged in with a transferor account.

In some embodiments, a smart contract is deployed in the blockchain network, the smart contract is used to manage assets owned by each account and to implement transfers between accounts. For any asset, the asset contains an encrypted amount E (v), and the encrypted amount is obtained by encrypting an amount v corresponding to the asset with a public key of the account that owns the asset.

The transferor client is configured to: determine a transferee account, a transfer amount, and at least one expense asset; and create a change asset and a transfer asset based on the transfer amount and an amount corresponding to the at least one expense asset, wherein the encrypted amount contained in the change asset is obtained by encrypting the amount corresponding to the change asset with the public key of the transferor account, the encrypted amount contained in the transfer asset is obtained by encrypting the amount corresponding to the transfer asset with the public key of the transferee account; specify N other transferee accounts, and create N other transfer assets that correspond to the N other transferee accounts in a one-to-one manner, wherein for each other transfer asset, the encrypted amount contained in the other transfer asset is obtained by encrypting zero with the public key of the corresponding other transferee account; and construct a transfer transaction and submit the transfer transaction to the blockchain network, wherein the transfer transaction includes an account identifier of the transferee account, the transfer asset, the change asset, the at least one expense asset, account identifiers of the N other transferee accounts, the N other transfer assets, a correspondence between the transferee account and the transfer asset, and the one-to-one correspondence between the N other transferee accounts and the N other transfer assets.

The blockchain network is configured to: verify the transfer transaction using the smart contract, wherein verifying the transfer transaction includes: determining, based on a homomorphic encryption algorithm, whether the sum of the amount corresponding to the transfer asset, the amount corresponding to the change asset and the amount corresponding to the N other transfer assets is equal to the amount corresponding to the at least one expense asset; and if determining that the verification is successful, deduct the at least one expense asset from the transferor account, add the change asset to the transferor account, add the transfer asset to the transferee account, and add corresponding other transfer asset to each other transferee account using the smart contract.

The technical solutions provided by the embodiments of the present disclosure are as follows. First, a smart contract is deployed in a blockchain network. The smart contract is used to manage the assets owned by each account and to implement transfers between accounts. In other words, separate from the asset-transferring system supported by the blockchain network by default, an asset-transferring system is built inside the smart contract, through which the user's asset management and transfer are performed.

Second, the user's account balance is embodied into several assets. As a data structure, the asset contains an encrypted amount, which is obtained by encrypting the corresponding amount of the asset with the public key of the account that owns the asset. In this way, the amount of assets in the user's account is invisible (that is, the account balance is not visible), and only the user can decrypt and check it with a private key.

Third, the transferor user is transferring money to the transferee user, is in fact, transferring the assets the transferor user owns to the transferee user. The expense amount, transfer amount, and change amount involved in the transfer transaction will not be exposed to each node. But this will not affect each node in the blockchain network to verify the transfer transaction (that is, to determine whether the input and output involved in the transfer transaction are equal). Each node uses a homomorphic encryption algorithm to determine whether the expense amount is equal to the sum of the transfer amount and the change amount without obtaining the specific expense amount, transfer amount, and change amount. Each node can use a homomorphic encryption algorithm to determine whether the spent amount is equal to the sum of the transferred amount and the change amount without obtaining the specific spend amount, transfer amount, and change amount.

Through the embodiments of the present disclosure, the user's account balance can be concealed, and the transfer between users can be implemented while concealing the transfer amount.

In addition, through the technical solutions of the second and fourth aspects, the information on the actual transferee account involved in a transfer transaction can also be concealed. In some cases, in a transfer transaction, at least one deceptive transferee account is added, and the deceptive transferee amount of the transfer account to each deceptive transferee account is zero. Since the deceptive transfer amount is encrypted, it can cause confusion in the transferee accounts, and the outside world may not accurately distinguish which account the actual transferee account is.

It should be understood that the above general description and the following detailed description are merely exemplary and illustrative, and should not limit the embodiments of the present disclosure.

In addition, any one of the embodiments in the present disclosure does not need to achieve all the effects described above.

BRIEF DESCRIPTION OF DRAWINGS

In order to more clearly explain the embodiments of the present disclosure or the technical solutions in the prior art, the drawings used in the embodiments or the description of the prior art will be briefly described below. The drawings in the following description are merely some of the embodiments described in the embodiments of the present disclosure. For those of ordinary skill in the art, other drawings can be obtained based on these drawings.

DETAILED DESCRIPTION OF THE EXAMPLES

Figure 1:
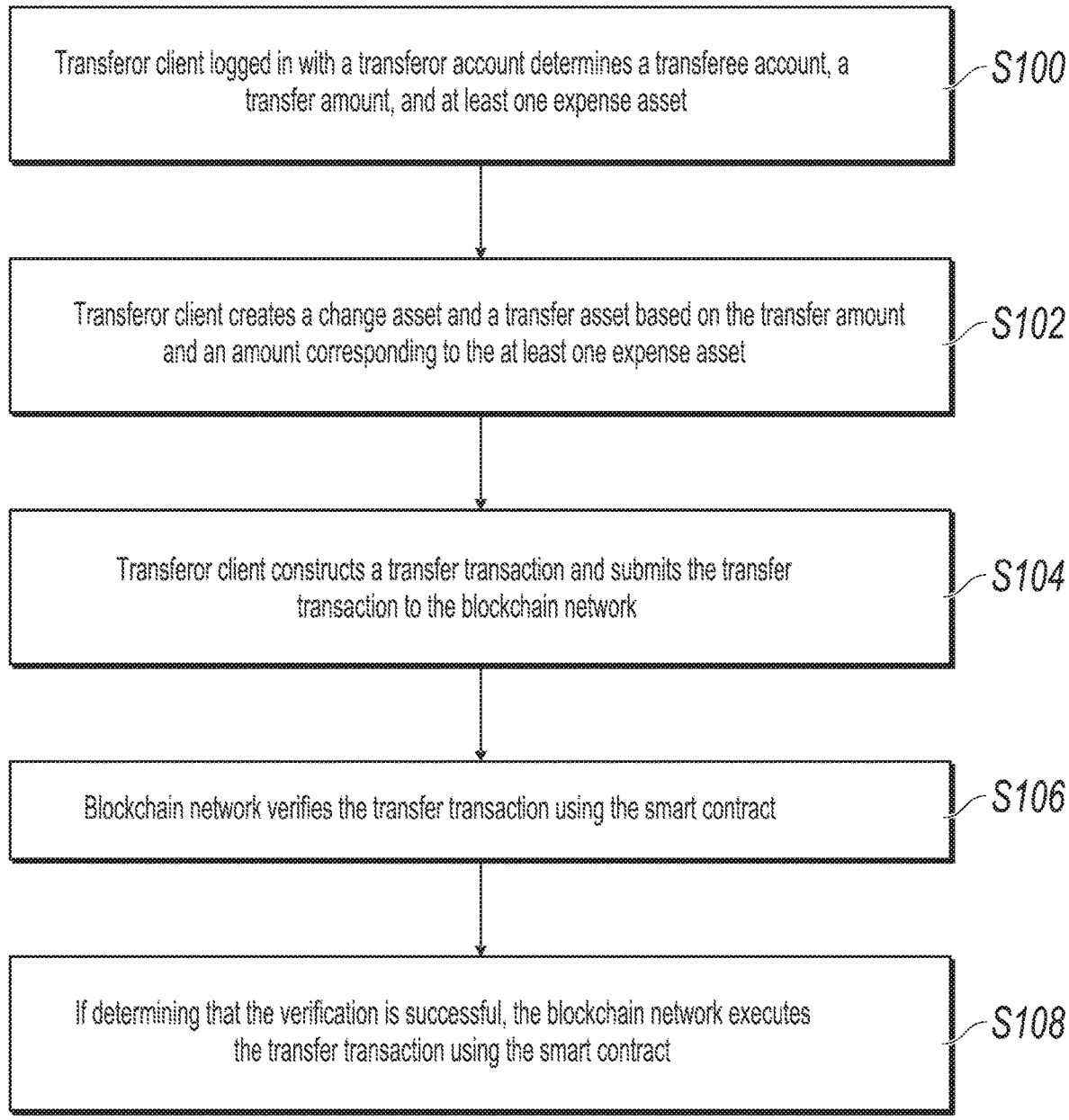
FIG. 1 is a schematic flowchart illustrating a transferring method based on a blockchain smart contract according to an embodiment of the present disclosure.

In conventional blockchain-based transfer solutions, verification of a transfer transaction by each node in a blockchain network generally includes verifying whether the balance of the transferor account is sufficient, that is, whether the balance of account A is larger than or equal to the transfer amount, and if so, the verification is successful. This means that if the transfer is to be performed, the account balance of the transferor and the transfer amount will be exposed to each node in the blockchain network.

The focus of the present solution is how to determine whether the account balance of the transferor user is sufficient to pay the transfer amount without exposing the account balance and the transfer amount of the transferor user.

In order to meet this demand, in the embodiments of the present disclosure, smart contracts are deployed in the blockchain network, and an asset-transferring system is established based on the smart contracts. In this system, there can be no concept of account balance, and instead, an amount in a user's account is turned to a data structure of an asset object. The asset is equivalent to a virtual item. During transferring between users, the transferor user spends an asset owned by the transferor user, and the asset is split into a transfer asset and a change asset. The transfer asset is transferred to the transferee user, and the change asset is returned to the transferor user. Under special circumstances, the amount of asset spent by the user is equal to the amount of asset that has been transferred. In this case, no change asset can be generated, or a change asset can also be generated (but the amount corresponding to the change assets is 0).

It should be noted that in this system, the data structure of the asset contains an encrypted amount, which is denoted as E (v), and the encrypted amount is generated by encrypting the amount (denoted as v) corresponding to the asset with a public key of the account that owns the asset. This means that the amount corresponding to the asset is concealed, and the account of the user who owns the asset has the right (using his private key) to view the amount corresponding to the asset the user owns. In addition, since the amount of asset held by each account is concealed, the account balance of each account is concealed.

In some embodiments, users register in a blockchain network and open their own accounts. A smart contract (can be regarded as a program) is responsible for managing the asset owned by each account, and responsible for verifying a transfer transaction (the smart contract records logical codes related to the verification matters). In some embodiments, a smart contract can maintain a user asset table in the form of key-value. In the user asset table, the key stores an account identifier and the value stores an asset identifier.

The following table 1 shows a user asset table as an example.

TABLE 1

| Account 1 | Asset 1, Asset 2 |
| Account 2 | Asset3, Asset4, Asset5 |
| Account 3 | Asset6 |

For example, Account 1 transfers 120 yuan to Account 2. In an example, the corresponding amount of Asset 1 is 100 yuan and the corresponding amount of Asset 2 is 50 yuan, then Account 1 needs to spend its own Assets 1 and 2. Thus, Assets 1 and 2 disappear and Asset 7 (with an amount of 120 yuan) and Asset 8 (with an amount of 30 yuan) are generated. Account 1 obtains Asset 8 and Account 2 obtains Asset 7. It can be seen that Asset 1+Asset 2 is the input of this transfer, and Asset 7+Asset 8 is the output of this transfer. After the smart contract verifies the input and the output involved in this transfer transaction, this transfer transaction will be executed, and Table 1 will be updated to Table 2 as shown below.

TABLE 2

| Account 1 | Asset 8 |
| Account 2 | Asset 3, Asset 4, Asset 5, Asset 7 |
| Account 3 | Asset 6 |

In this way, in the present disclosure, for a transfer transaction, the problem of verifying the balance is turned into a problem of verifying whether the input and the output are balanced. Since the amount of each asset is actually encrypted, the amount will not be exposed to each node in the blockchain network. When the node executes the transfer transaction, a homomorphic encryption algorithm is used to verify whether the input assets are equal to the output assets. If the verification is successful, it means that the transfer transaction is feasible (equivalent to that the balance of the transferor is sufficient).

In addition, this solution provides a method for recharging an asset in an account. In some embodiments, when a user's account is initialized, there are no asset in the account. The account can obtain an asset by receiving an asset transferred from other account, or by recharging an asset off-chain.

An account with a higher authority registered in the blockchain network can be responsible for asset recharge. For example, an administrator can register an administrator account in the blockchain network. The administrator account has the following authorities: initiating a recharge transaction, and the recharge transaction containing an account identifier of the recharged account and a recharged account. The encrypted amount contained in the recharged asset is obtained by encrypting a certain amount with the public key of the recharged account. In this way, users can use legal currency to purchase assets with a certain amount from the administrator off-chain. The administrator submits the recharge transaction to the blockchain network through the administrator account. The blockchain network can execute the recharge transaction using the smart contract to achieve recharge assets in an account.

In order to enable those skilled in the art to better understand the technical solutions in the embodiments of the present disclosure, the technical solutions in the embodiments of the present disclosure will be described in detail below with reference to the drawings in the embodiments of the present disclosure. The described embodiments are only a part of the embodiments of the present disclosure, not all of the embodiments. Based on the embodiments in the present disclosure, all other embodiments obtained by those skilled in the art should fall within the protection scope.

The technical solutions provided by the embodiments of the present disclosure will be described in detail below with reference to the drawings. It should be noted that, since the technical ideas on which the following embodiments are based are similar, the following embodiments can be understood by referring to each other.

FIG. 1 is a schematic flowchart illustrating a transferring method based on a blockchain smart contract according to an embodiment of the present disclosure, including the following steps.

At S100, a transferor client logged in with a transferor account determines a transferee account, a transfer amount, and at least one expense asset.

In some embodiments of the present disclosure, a user can install a blockchain client on the user's own device (such as a mobile phone, a personal computer, etc.), register with the blockchain network through the blockchain client, and open an account. The user can then log in to the user's account on the blockchain client and manage the user's assets.

A smart contract is deployed in the blockchain network. The smart contract is used to manage the assets owned by each account (that is, to record the assets owned by each account and to update the assets owned by each account at any time) and to implement transfer between accounts (that is, used to verify transfer transactions, execute transfer transactions).

In some embodiments of the present disclosure, for any asset, the asset contains an encrypted amount $E(v)$, and the encrypted amount is obtained by encrypting the amount v corresponding to an asset with a public key of the account that owns the asset. For example, an asset owned by Account 1 is obtained by encrypting a certain amount with the public key of Account 1. An asset received by Account 2 transferred from other account is obtained by encrypting the transfer amount with the public key of Account 2.

It can be seen that, in some embodiments of the present disclosure, an asymmetric encryption method is applied to ensure that the assets owned by each user can only be viewed by the user.

In some embodiments of the present disclosure, the transferor client refers to a blockchain client that has logged in with the account (transferor account) of the transferor user. A client logged in with the transferor account has authority to operate the assets in the transfer account.

When a transfer is required, the transferor client can determine the transferee account specified by the transferor user, the transfer amount, and at least one expense asset. The expense assets are assets that the transferor account already owns and which are specified by the transferor user for transfer.

In one embodiment, the amount corresponding to the expense assets specified by the transferor user can be larger than the transfer amount (the balance will be returned in the form of change), or the amount corresponding to the expense assets can be equal to the transfer amount (no remaining balance), but the amount may not be smaller than the transfer amount (otherwise the verification may not be successful).

At S102, the transferor client creates a change asset and a transfer asset based on the transfer amount and an amount corresponding to the at least one expense asset.

In some embodiments of the present disclosure, if the amount corresponding to the at least one expense asset is equal to the transfer amount, a change asset can also be created (with the corresponding amount being 0).

The encrypted amount contained in the change asset is obtained by encrypting the amount corresponding to the change asset with the public key of the transferor account, and the encrypted amount contained in the transfer asset is obtained by encrypting the amount corresponding to the transfer asset with the public key of the transferee account.

At S104, the transferor client constructs a transfer transaction and submits the transfer transaction to the blockchain network.

In the transfer transaction, the following contents are included: an account identifier of the transferee account, the transfer asset, the change asset, and the at least one expense asset.

At S106, the blockchain network verifies the transfer transaction using the smart contract.

In some embodiments of the present disclosure, the blockchain network verifies the transfer transaction. Generally, it is to verify whether the outgoing and incoming of the accounts involved in the transfer transaction are balanced. If the outgoing and incoming of the accounts are not balanced, it is determined that the transfer transaction is not executable and the transfer fails.

In some embodiments, each node in the blockchain network uses a homomorphic encryption algorithm to determine whether the sum of the amount corresponding to the transfer asset and the amount corresponding to the change asset is equal to the amount corresponding to the at least one expense asset.

It is well known that, homomorphic encryption refers to processing encrypted data to obtain an output, and decrypting the output, where the result is the same as the output obtained by processing the unencrypted data in the same way. Therefore, in some embodiments of the present disclosure, although the amounts corresponding to the transfer asset, the change asset, and the expense asset are encrypted and are concealed to the node, the node can use a homomorphic encryption algorithm to determine whether the sum of the amount corresponding to the transfer asset and the amount corresponding to the change asset is equal to the amount corresponding to the at least one expense asset without decrypting the encrypted amounts corresponding to the transfer asset, the change asset, and the expense asset.

Further, an embodiment of a homomorphic encryption algorithm based on the Pedersen commitment mechanism is described below.

For any asset, the asset also contains a Pedersen commitment parameter $g^t h^r$ and an encrypted random number E (r) obtained by encrypting a random number r. For any asset, the random number r corresponding to E (r) contained in the asset is randomly assigned to the asset, that is, the random numbers r corresponding to any two assets may not be the same. It should be noted that the function of r is to prevent $g^t h^r$ from being illegally analyzed.

When verifying the transfer transaction, the node can use a homomorphic encryption algorithm based on the Pedersen commitment mechanism. Based on the Pedersen commitment parameter included in the transfer asset, the Pedersen commitment parameter included in the change asset, and the Pedersen commitment parameter included in the at least one expense asset, the node determines whether the sum of the amount corresponding to the transfer asset and the amount corresponding to the change asset is equal to the amount corresponding to the at least one expense asset. Here, g and h are elliptic curve generators. In some embodiments of the present disclosure, all assets use the same g and h.

At S108, if determining that the verification is successful, the blockchain network executes the transfer transaction using the smart contract.

In some embodiments of the present disclosure, if the determining result shows that the sum of the amount corresponding to the transfer asset and the amount corresponding to the change asset is equal to the amount corresponding to the at least one expense asset, the verification can be deemed to be successful.

Executing the transfer transaction includes: deducting the at least one expense asset from the transferor account, adding the change asset to the transferor account, and adding the transfer asset to the transferee account using the smart contract. That is, the assets of the transferor account and the transferee account are updated by the smart contract.

In addition, in some cases, the transferor user can be malicious. The transfer amount is designated as a negative number, to steal assets of others by the transferring method. Or, due to a transferor user's operation error or a failure of the transferor client, the amount corresponding to the change asset is designated as a negative number, resulting in the actual amount transferred by the transferor user is larger than the amount originally intended to be transferred.

In view of this, based on the principle of zero-knowledge proof, when the actual amount of the transfer asset and the actual amount of the change asset are not visible, it is verified whether the actual amount of the transfer asset and the actual amount of the change asset fall within a specified value range, such as $[0, \infty)$ or $[0, 2^{64}]$. If the verification result is confirmative, the possibility of the above situation can be ruled out.

In some embodiments, the transfer transaction can also include a range proof, which can be a Bullet Proof, a Borromean ring signature, and the like.

In this way, when verifying the transfer transaction, it is also possible to determine whether the amount corresponding to the transfer asset and the amount corresponding to the change asset fall within the specified value range based on the range proof.

In addition, in some cases, the transferor user can maliciously spend assets that do not belong to the transferor user for transfer. To prevent this from happening, when verifying the transfer transaction, it is possible to determine using the smart contract whether the at least one expense asset exists in the assets owned by the transferor account based on the account asset state recorded by the smart contract.

In some embodiments of the present disclosure, for any asset, the asset also includes a first state parameter that indicates whether the asset has been spent or not spent. In this way, when verifying the transfer transaction, the node can determine, using the smart contract, for each expense asset included in the transfer transaction, whether the expense asset has been spent based on the first state parameter that the expense asset can include. If the determining result is confirmative, the first state parameter included in the expense asset is modified, so that the modified first state parameter indicates that the expense asset has been spent.

In addition, for any asset, the asset can also include a second state parameter that indicates the presence or absence of the asset. Thus, when verifying the transfer transaction, the smart contract can also be used to determine, for each expense asset included in the transfer transaction, whether the expense asset exists based on the second state parameter included in the expense asset.

For each verification matter described above, each verification matter corresponds to a determining result. In some embodiments of the present disclosure, if the blockchain network determines that the determining results generated during the process of verifying the transfer transaction are all confirmative, then it is determined that the verification is successful.

Figure 2:
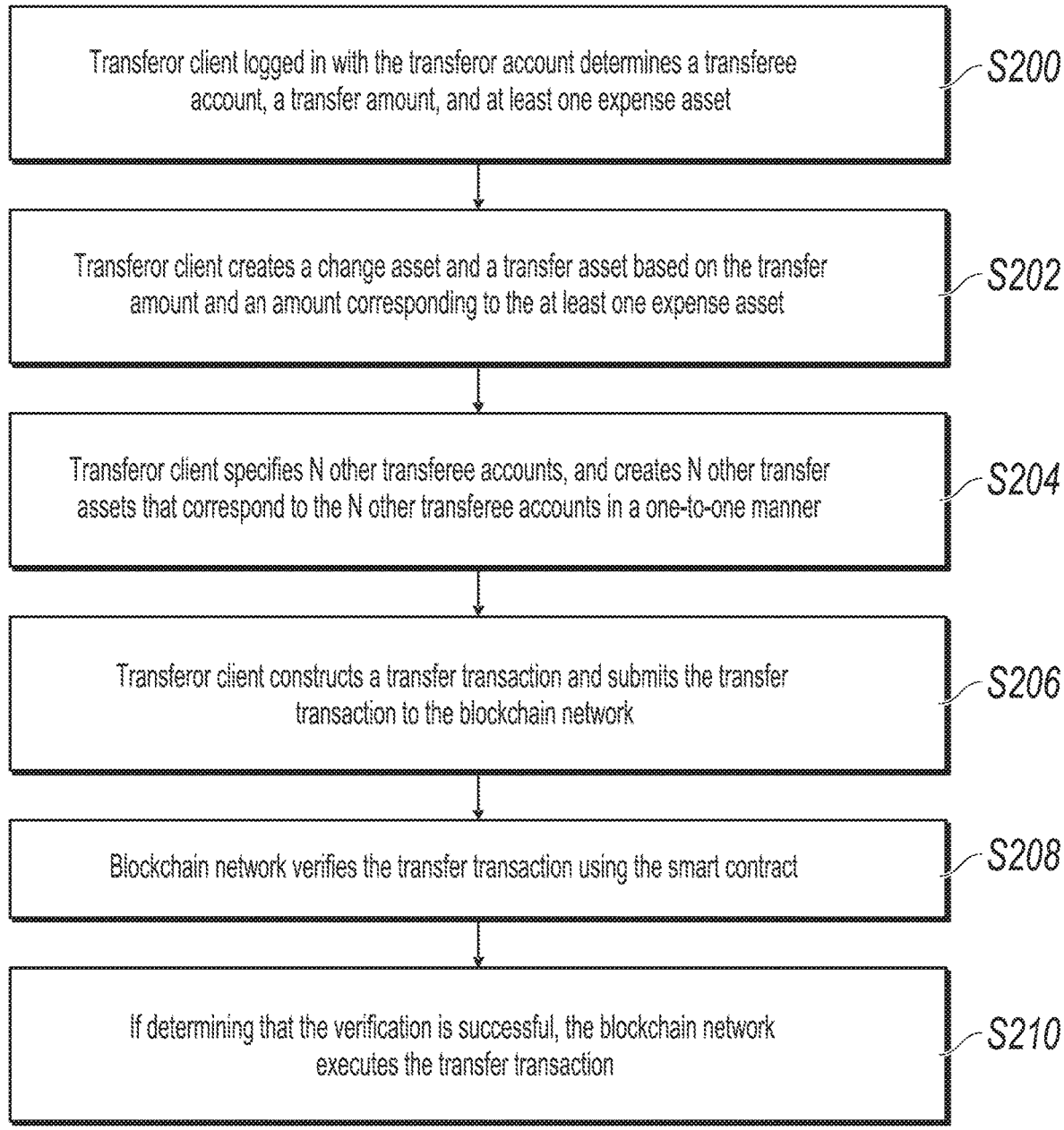
FIG. 2 is a schematic flowchart illustrating another transferring method based on a blockchain smart contract according to an embodiment of the present disclosure.

FIG. 2 is a schematic flowchart illustrating another transferring method based on a blockchain smart contract according to an embodiment of the present disclosure, including the following steps.

At S200, the transferor client logged in with the transferor account determines a transferee account, a transfer amount, and at least one expense asset.

At S202, the transferor client creates a change asset and a transfer asset based on the transfer amount and an amount corresponding to the at least one expense asset.

The encrypted amount contained in the change asset is obtained by encrypting the amount corresponding to the change asset with the public key of the transferor account, and the encrypted amount contained in the transfer asset is obtained by encrypting the amount corresponding to the transfer asset with the public key of the transferee account.

At S204, the transferor client specifies N other transferee accounts, and creates N other transfer assets that correspond to the N other transferee accounts in a one-to-one manner.

For each other transfer asset, the encrypted amount contained in the other transfer asset is obtained by encrypting zero with the public key of the corresponding other transferee account.

At S206, the transferor client constructs a transfer transaction and submits the transfer transaction to the blockchain network.

The transfer transaction includes an account identifier of the transferee account, the transfer asset, the change asset, the at least one expense asset, account identifiers of the N other transferee accounts, and the N other transfer assets.

It should be understood that the transfer transaction can also include other content to represent the correspondence between the transferee account and the transfer asset, and the one-to-one correspondence between the N other transferee accounts and the N other transfer assets.

At S208, the blockchain network verifies the transfer transaction using the smart contract.

Verifying the transfer transaction includes: determining, based on a homomorphic encryption algorithm, whether the sum of the amount corresponding to the transfer asset, the amount corresponding to the change asset, and the amount corresponding to the N other transfer assets is equal to the amount corresponding to the at least one expense asset.

At S210, if determining that the verification is successful, the blockchain network executes the transfer transaction.

Executing the transfer transaction includes: deducting the at least one expense asset from the transferor account, adding the change asset to the transferor account, adding the transfer asset to the transferee account, and adding corresponding other transfer asset to each other transferee account using the smart contract.

The method shown in FIG. 2 is obtained by further improvement on the basis of the method shown in FIG. 1. For details, reference can be made to the description of the method shown in FIG. 1.

In the method shown in FIG. 2, not only the account balance and the amount of the transfer can be concealed, but also the information of the transferee user (that is, the identity of the transferee user is not exposed) can be concealed. In a transfer transaction, at least one deceptive transferee account is added, and the deceptive transfer amount of the transferor account to each deceptive transferee account is zero. Since the deceptive transfer amount is encrypted, it can cause confusion in the transferee accounts, and the outside world may not accurately distinguish which account the actual transferee account is. It should be noted that N is a natural number larger than 0, and the larger N is, the better the obfuscation effect is.

In the method shown in FIG. 2, a homomorphic encryption algorithm based on the Pedersen commitment mechanism can also be used. Based on the Pedersen commitment parameters included in the transfer asset, in the change asset, in the at least one expense asset and in the N other transfer assets, it can be determined whether the sum of the amount corresponding to the transfer asset, the amount corresponding to the change asset, and the amount corresponding to the N other transfer assets is equal to the amount corresponding to the at least one expense asset.

The smart contract can also be used to determine whether the amount corresponding to the transfer asset, the amount corresponding to the change asset, and the amount corresponding to the N other transfer assets all fall into $[0, \infty]$ or all fall into $[0, 2^{64}]$ based on the range proof.

Figure 3:
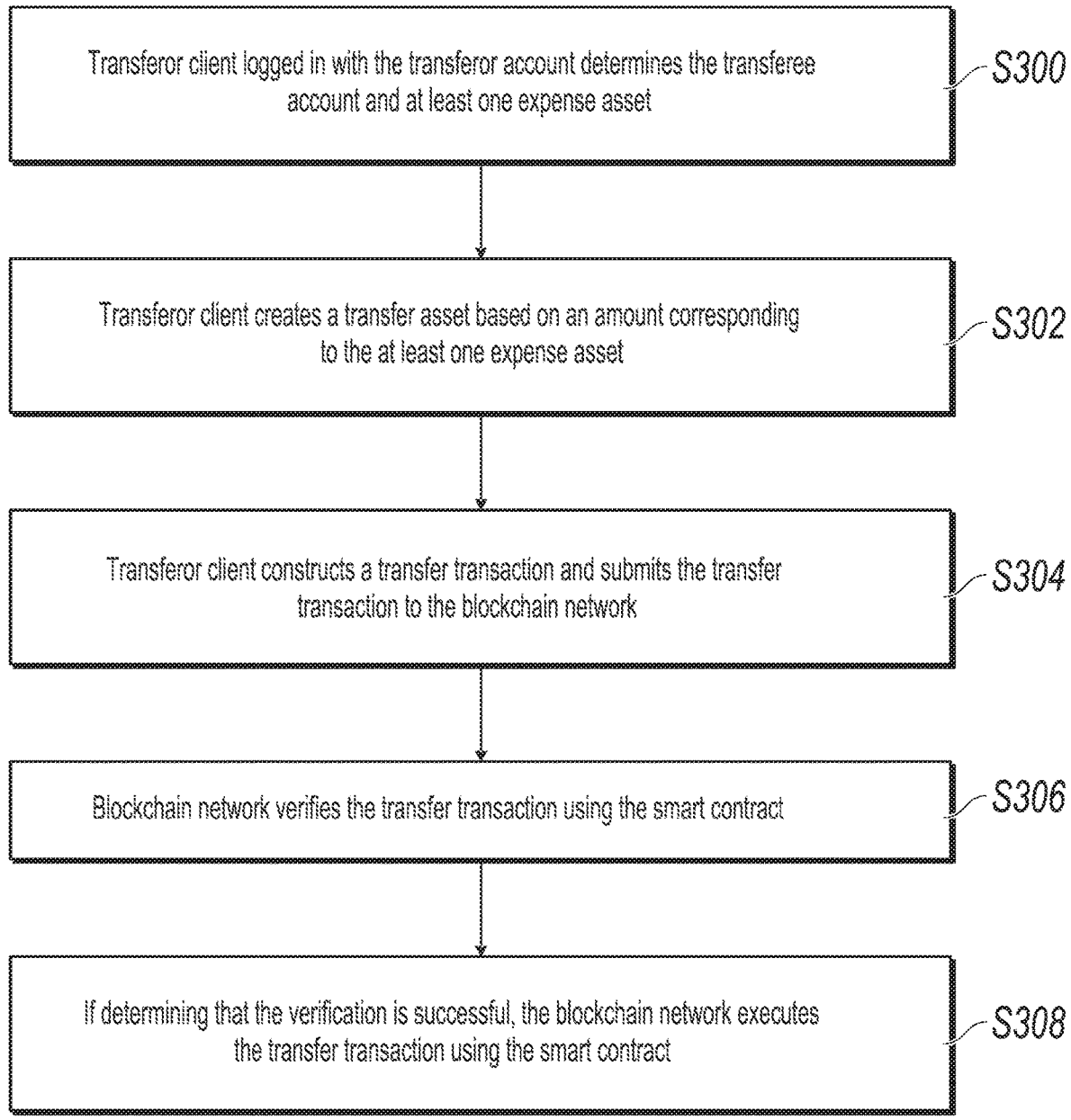
FIG. 3 is a schematic flowchart illustrating another transferring method based on a blockchain smart contract according to an embodiment of the present disclosure.

FIG. 3 is a schematic flowchart illustrating another transferring method based on a blockchain smart contract according to an embodiment of the present disclosure, including the following steps.

At S300, the transferor client logged in with the transferor account determines the transferee account and at least one expense asset.

At S302, the transferor client creates a transfer asset based on an amount corresponding to the at least one expense asset.

The encrypted amount included in the transfer asset is obtained by encrypting the amount corresponding to the transfer asset with the public key of the transferee account. It can be seen that in the method shown in FIG. 3, the transfer amount specified by the transferor user is equal to the amount corresponding to the at least one expense asset, and there will be no remaining balance.

At S304, the transferor client constructs a transfer transaction and submits the transfer transaction to the blockchain network.

The transfer transaction includes an account identifier of the transferee account, the transfer asset, and the at least one expense asset.

At S306, the blockchain network verifies the transfer transaction using the smart contract.

Verifying the transfer transaction includes: determining, based on a homomorphic encryption algorithm, whether the sum of the amount corresponding to the transfer asset is equal to the amount corresponding to the at least one expense asset.

At S308, if determining that the verification is successful, the blockchain network executes the transfer transaction using the smart contract.

Executing the transfer transaction includes: deducting the at least one expense asset from the transferor account, and adding the transfer asset to the transferee account.

Figure 4:
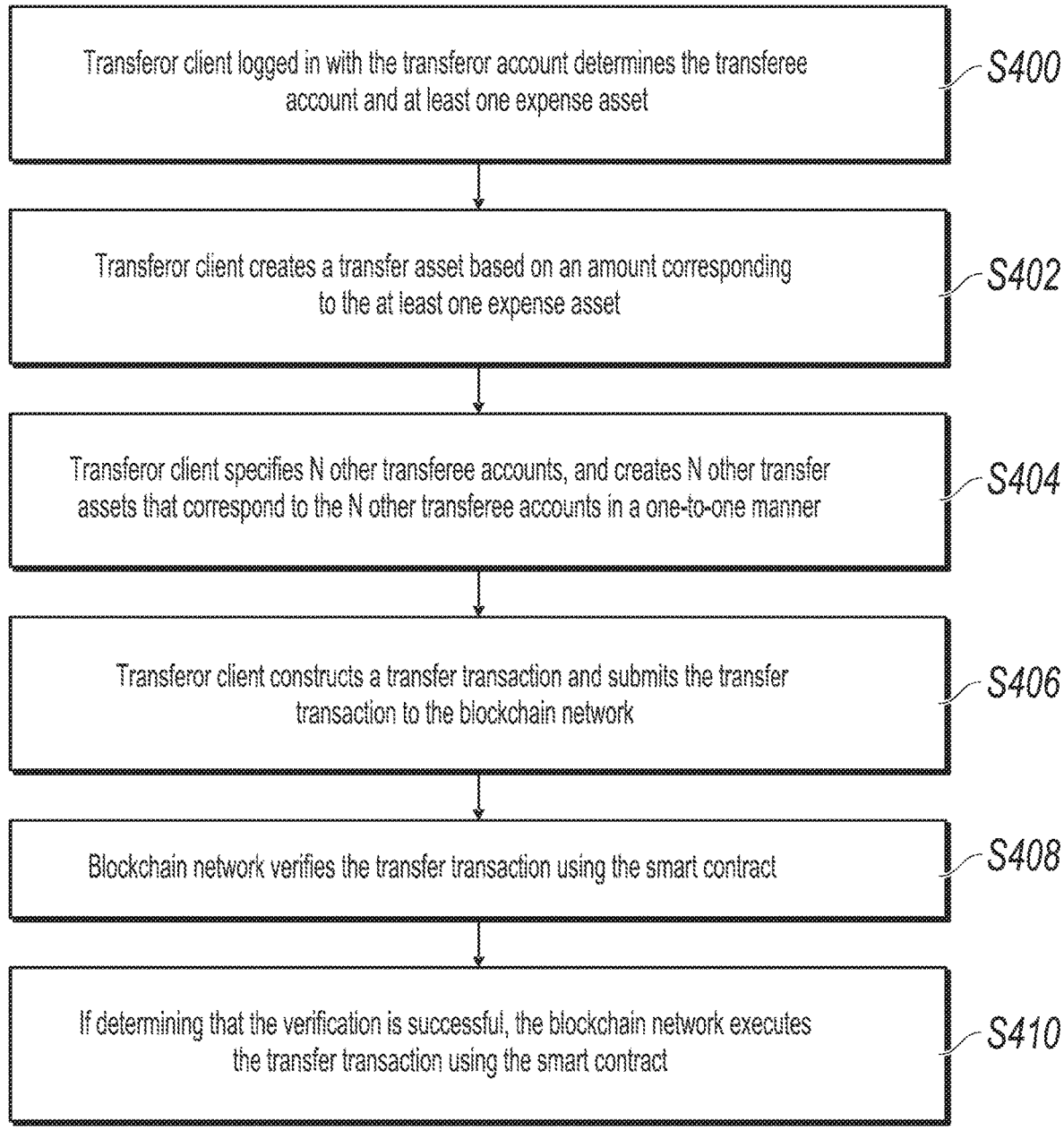
FIG. 4 is a schematic flowchart illustrating another transferring method based on a blockchain smart contract according to an embodiment of the present disclosure.

FIG. 4 is a schematic flowchart illustrating another transferring method based on a blockchain smart contract according to an embodiment of the present disclosure, including the following steps.

At S400, the transferor client logged in with the transferor account determines the transferee account and at least one expense asset.

At S402, the transferor client creates a transfer asset based on an amount corresponding to the at least one expense asset.

The encrypted amount included in the transfer asset is obtained by encrypting the amount corresponding to the transfer asset with the public key of the transferee account. It can be seen that in the method shown in FIG. 4, the transfer amount specified by the transferor user is equal to the amount corresponding to the at least one expense asset, and there will be no remaining balance.

At S404, the transferor client specifies N other transferee accounts, and creates N other transfer assets that correspond to the N other transferee accounts in a one-to-one manner.

For each other transfer asset, the encrypted amount contained in the other transfer asset is obtained by encrypting zero with the public key of the corresponding other transferee account.

At S406, the transferor client constructs a transfer transaction and submits the transfer transaction to the blockchain network.

The transfer transaction includes an account identifier of the transferee account, the transfer asset, the at least one expense asset, account identifiers of the N other transferee accounts, and the N other transfer assets.

At S408, the blockchain network verifies the transfer transaction using the smart contract.

Verifying the transfer transaction includes: determining, based on a homomorphic encryption algorithm, whether the sum of the amount corresponding to the transfer asset and the amount corresponding to the N other transfer assets is equal to the amount corresponding to the at least one expense asset.

At S410, if determining that the verification is successful, the blockchain network executes the transfer transaction using the smart contract.

Executing the transfer transaction includes: deducting the at least one expense asset from the transferor account, adding the transfer asset to the transferee account, and adding corresponding other transfer asset to each other transferee account.

A transferring system based on a blockchain smart contract, includes a blockchain network and a transferor client logged in with a transferor account.

A smart contract is deployed in the blockchain network. The smart contract is used to manage assets owned by each account and to implement transfers between accounts. For any asset, the asset contains an encrypted amount E (v), and the encrypted amount is obtained by encrypting an amount v corresponding to the asset with a public key of the account that owns the asset.

The transferor client determines a transferee account, a transfer amount, and at least one expense asset, and creates a change asset and a transfer asset based on the transfer amount and an amount corresponding to the at least one expense asset. The encrypted amount contained in the change asset is obtained by encrypting the amount corresponding to the change asset with the public key of the transferor account, and the encrypted amount contained in the transfer asset is obtained by encrypting the amount corresponding to the transfer asset with the public key of the transferee account. The transferor client constructs a transfer transaction and submits the transfer transaction to the blockchain network. The transfer transaction includes an account identifier of the transferee account, the transfer asset, the change asset, and the at least one expense asset.

The blockchain network verifies the transfer transaction using the smart contract, wherein verifying the transfer transaction includes: determining, based on a homomorphic encryption algorithm, whether the sum of the amount corresponding to the transfer asset and the amount corresponding to the change asset is equal to the amount corresponding to the at least one expense asset; if it is determined that the verification is successful, deducts the at least one expense asset from the transferor account, adds the change asset to the transferor account, and adds the transfer asset to the transferee account using the smart contract.

A transferring system based on a blockchain smart contract, includes a blockchain network and a transferor client logged in with a transferor account.

A smart contract is deployed in the blockchain network. The smart contract is used to manage assets owned by each account and to implement transfers between accounts. For any asset, the asset contains an encrypted amount E (v), and the encrypted amount is obtained by encrypting an amount v corresponding to the asset with a public key of the account that owns the asset.

The transferor client determines a transferee account, a transfer amount, and at least one expense asset; and creates a change asset and a transfer asset based on the transfer amount and an amount corresponding to the at least one expense asset, wherein the encrypted amount contained in the change asset is obtained by encrypting the amount corresponding to the change asset with the public key of the transferor account, and the encrypted amount contained in the transfer asset is obtained by encrypting the amount corresponding to the transfer asset with the public key of the transferee account; specifies N other transferee accounts, and creates N other transfer assets that correspond to the N other transferee accounts in a one-to-one manner. For each other transfer asset, the encrypted amount contained in the other transfer asset is obtained by encrypting zero with the public key of the corresponding other transferee account. The transferor client constructs a transfer transaction and submits the transfer transaction to the blockchain network. The transfer transaction includes an account identifier of the transferee account, the transfer asset, the change asset, the at least one expense asset, account identifiers of the N other transferee accounts, and the N other transfer assets.

The blockchain network verifies the transfer transaction using the smart contract. Verifying the transfer transaction includes: determining, based on a homomorphic encryption algorithm, whether the sum of the amount corresponding to the transfer asset, the amount corresponding to the change asset, and the amount corresponding to the N other transfer assets is equal to the amount corresponding to the at least one expense asset; if it is determined that the verification is successful, deducts the at least one expense asset from the transferor account, adds the change asset to the transferor account, adds the transfer asset to the transferee account, and adds corresponding other transfer asset to each other transferee account using the smart contract.

A transferring system based on a blockchain smart contract, includes a blockchain network and a transferor client logged in with a transferor account.

A smart contract is deployed in the blockchain network. The smart contract is used to manage assets owned by each account and to implement transfers between accounts. For any asset, the asset contains an encrypted amount E (v), and the encrypted amount is obtained by encrypting an amount v corresponding to the asset with a public key of the account that owns the asset.

The transferor client determines a transferee account and at least one expense asset, and creates a transfer asset based on an amount corresponding to the at least one expense asset. The encrypted amount contained in the transfer asset is obtained by encrypting the amount corresponding to the transfer asset with the public key of the transferee account. The transferor client constructs a transfer transaction and submits the transfer transaction to the blockchain network.

The transfer transaction includes an account identifier of the transferee account, the transfer asset, and the at least one expense asset.

The blockchain network verifies the transfer transaction using the smart contract, wherein verifying the transfer transaction includes: determining, based on a homomorphic encryption algorithm, whether the amount corresponding to the transfer asset is equal to the amount corresponding to the at least one expense asset; if it is determined that the verification is successful, deducts the at least one expense asset from the transferor account, and adds the transfer asset to the transferee account using the smart contract.

A transferring system based on a blockchain smart contract, includes a blockchain network and a transferor client logged in with a transferor account.

A smart contract is deployed in the blockchain network. The smart contract is used to manage assets owned by each account and to implement transfers between accounts. For any asset, the asset contains an encrypted amount E (v), and the encrypted amount is obtained by encrypting an amount v corresponding to the asset with a public key of the account that owns the asset.

The transferor client determines a transferee account and at least one expense asset; and creates a transfer asset based on an amount corresponding to the at least one expense asset, wherein the encrypted amount contained in the transfer asset is obtained by encrypting the amount corresponding to the transfer asset with the public key of the transferee account; specifies N other transferee accounts, and creates N other transfer assets that correspond to the N other transferee accounts in a one-to-one manner, wherein for each other transfer asset, the encrypted amount contained in the other transfer asset is obtained by encrypting zero with the public key of the corresponding other transferee account; constructs a transfer transaction and submits the transfer transaction to the blockchain network. The transfer transaction includes an account identifier of the transferee account, the transfer asset, the at least one expense asset, account identifiers of the N other transferee accounts, and the N other transfer assets.

The blockchain network verifies the transfer transaction using the smart contract, wherein verifying the transfer transaction includes: determining, based on a homomorphic encryption algorithm, whether the sum of the amount corresponding to the transfer asset and the amount corresponding to the N other transfer assets is equal to the amount corresponding to the at least one expense asset; if it is determined that the verification is successful, deducts the at least one expense asset from the transferor account, adds the transfer asset to the transferee account, and adds corresponding other transfer asset to each other transferee account using the smart contract.

Figure 5:
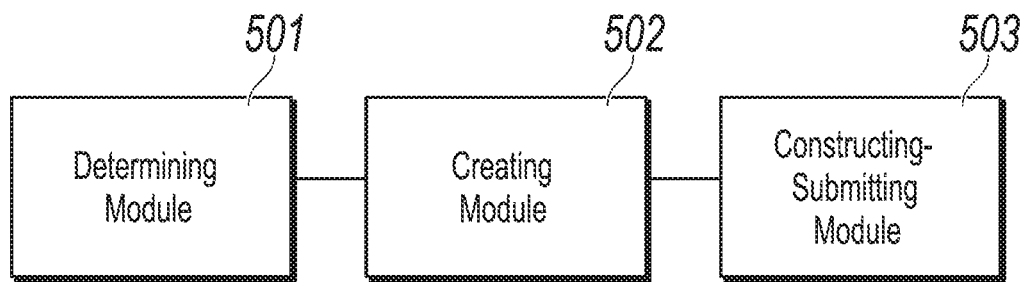
FIG. 5 is a schematic block diagram illustrating a transferring apparatus based on a blockchain smart contract according to an embodiment of the present disclosure.

FIG. 5 is a schematic block diagram illustrating a transferring apparatus based on a blockchain smart contract according to an embodiment of the present disclosure. A smart contract is deployed in the blockchain network. The smart contract is used to manage assets owned by each account and to implement transfers between accounts. For any asset, the asset contains an encrypted amount E (v), and the encrypted amount is obtained by encrypting an amount v corresponding to the asset with a public key of the account that owns the asset.

The transferring apparatus is a transferor client logged in with a transferor account, and the transferring apparatus includes: a determining module 501 configured to determine a transferee account, a transfer amount, and at least one expense asset; a creating module 502 configured to create a change asset and a transfer asset based on the transfer amount and an amount corresponding to the at least one expense asset, wherein the encrypted amount contained in the change asset is obtained by encrypting the amount corresponding to the change asset with the public key of the transferor account, and the encrypted amount contained in the transfer asset is obtained by encrypting the amount corresponding to the transfer asset with the public key of the transferee account; and a constructing-submitting module 503 configured to construct a transfer transaction and submit the transfer transaction to the blockchain network, wherein the transfer transaction includes an account identifier of the transferee account, the transfer asset, the change asset, and the at least one expense asset.

Figure 6:
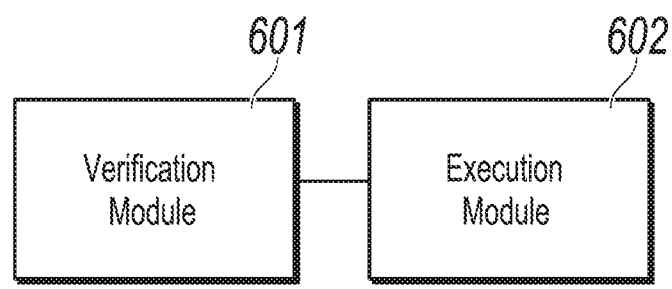
FIG. 6 is a schematic block diagram illustrating a transferring apparatus based on a blockchain smart contract according to an embodiment of the present disclosure.

FIG. 6 is a schematic block diagram illustrating a transferring apparatus based on a blockchain smart contract according to an embodiment of the present disclosure. A smart contract is deployed in the blockchain network. The smart contract is used to manage assets owned by each account and to implement transfers between accounts. For any asset, the asset contains an encrypted amount E (v), and the encrypted amount is obtained by encrypting an amount v corresponding to the asset with a public key of the account that owns the asset.

The transferring apparatus is any node in the blockchain network, and the transferring apparatus includes: a verification module 601 configured to verify the transfer transaction using the smart contract, wherein verifying the transfer transaction includes: determining, based on a homomorphic encryption algorithm, whether the sum of the amount corresponding to the transfer asset and the amount corresponding to the change asset is equal to the amount corresponding to the at least one expense asset; and an execution module 602 configured to, if determining that the verification is successful, deduct the at least one expense asset from the transferor account, add the change asset to the transferor account, and add the transfer asset to the transferee account using the smart contract.

Figure 7:
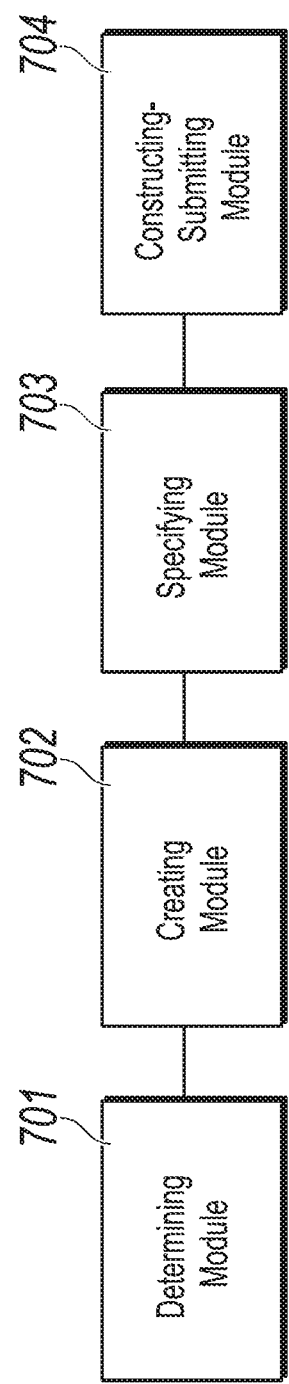
FIG. 7 is a schematic block diagram illustrating a transferring apparatus based on a blockchain smart contract according to an embodiment of the present disclosure.

FIG. 7 is a schematic block diagram illustrating a transferring apparatus based on a blockchain smart contract according to an embodiment of the present disclosure. A smart contract is deployed in the blockchain network. The smart contract is used to manage assets owned by each account and to implement transfers between accounts. For any asset, the asset contains an encrypted amount E (v), and the encrypted amount is obtained by encrypting an amount v corresponding to the asset with a public key of the account that owns the asset.

The transferring apparatus is a transferor client logged in with a transferor account, and the transferring apparatus includes: a determining module 701 configured to determine a transferee account, a transfer amount, and at least one expense asset; a creating module 702 configured to create a change asset and a transfer asset based on the transfer amount and an amount corresponding to the at least one expense asset, wherein the encrypted amount contained in the change asset is obtained by encrypting the amount corresponding to the change asset with the public key of the transferor account, and the encrypted amount contained in the transfer asset is obtained by encrypting the amount corresponding to the transfer asset with the public key of the transferee account; a specifying module 703 configured to specify N other transferee accounts, and create N other transfer assets that correspond to the N other transferee accounts in a one-to-one manner, wherein for each other transfer asset, the encrypted amount contained in the other transfer asset is obtained by encrypting zero with the public key of the corresponding other transferee account; and a constructing-submitting module 704 configured to construct a transfer transaction and submit the transfer transaction to the blockchain network, wherein the transfer transaction includes an account identifier of the transferee account, the transfer asset, the change asset, the at least one expense asset, account identifiers of the N other transferee accounts, and the N other transfer assets.

Figure 8:
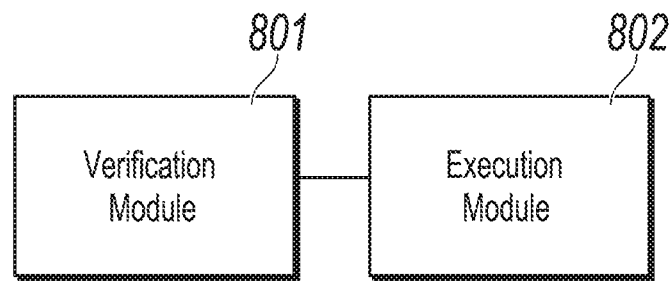
FIG. 8 is a schematic block diagram illustrating a transferring apparatus based on a blockchain smart contract according to an embodiment of the present disclosure.

FIG. 8 is a schematic block diagram illustrating a transferring apparatus based on a blockchain smart contract according to an embodiment of the present disclosure. A smart contract is deployed in the blockchain network. The smart contract is used to manage assets owned by each account and to implement transfers between accounts. For any asset, the asset contains an encrypted amount E (v), and the encrypted amount is obtained by encrypting an amount v corresponding to the asset with a public key of the account that owns the asset.

The transferring apparatus is any node in the blockchain network, and the transferring apparatus includes: a verification module 801 configured to verify the transfer transaction using the smart contract, wherein verifying the transfer transaction includes: determining, based on a homomorphic encryption algorithm, whether the sum of the amount corresponding to the transfer asset, the amount corresponding to the change asset, and the amount corresponding to the N other transfer assets is equal to the amount corresponding to the at least one expense asset; and an execution module 802 configured to, if determining that the verification is successful, deduct the at least one expense asset from the transferor account, add the change asset to the transferor account, add the transfer asset to the transferee account, and add corresponding other transfer asset to each other transferee account using the smart contract.

Figure 9:
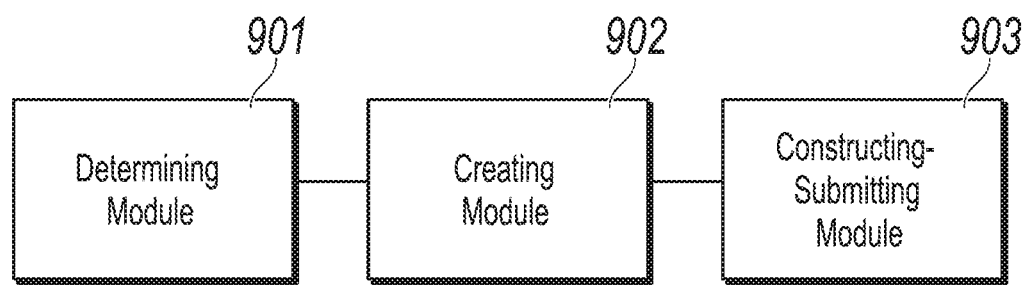
FIG. 9 is a schematic block diagram illustrating a transferring apparatus based on a blockchain smart contract according to an embodiment of the present disclosure.

FIG. 9 is a schematic block diagram illustrating a transferring apparatus based on a blockchain smart contract according to an embodiment of the present disclosure. A smart contract is deployed in the blockchain network. The smart contract is used to manage assets owned by each account and to implement transfers between accounts. For any asset, the asset contains an encrypted amount E (v), and the encrypted amount is obtained by encrypting an amount v corresponding to the asset with a public key of the account that owns the asset.

The transferring apparatus is a transferor client logged in with a transferor account, and the transferring apparatus includes: a determining module 901 configured to determine a transferee account and at least one expense asset; a creating module 902 configured to create a transfer asset based on an amount corresponding to the at least one expense asset, wherein the encrypted amount contained in the transfer asset is obtained by encrypting the amount corresponding to the transfer asset with the public key of the transferee account; and a constructing-submitting module 903 configured to construct a transfer transaction and submit the transfer transaction to the blockchain network, wherein the transfer transaction includes an account identifier of the transferee account, the transfer asset, and the at least one expense asset.

Figure 10:
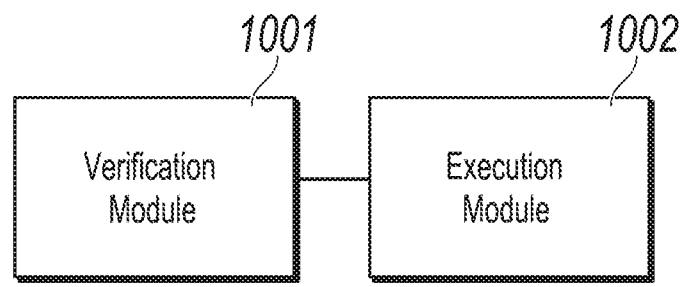
FIG. 10 is a schematic block diagram illustrating a transferring apparatus based on a blockchain smart contract according to an embodiment of the present disclosure; FIG.

FIG. 10 is a schematic block diagram illustrating a transferring apparatus based on a blockchain smart contract according to an embodiment of the present disclosure. A smart contract is deployed in the blockchain network. The smart contract is used to manage assets owned by each account and to implement transfers between accounts. For any asset, the asset contains an encrypted amount E (v), and the encrypted amount is obtained by encrypting an amount v corresponding to the asset with a public key of the account that owns the asset.

The transferring apparatus is any node in the blockchain network, and the transferring apparatus includes: a verification module 1001 configured to verify the transfer transaction using the smart contract, wherein verifying the transfer transaction includes: determining, based on a homomorphic encryption algorithm, whether the amount corresponding to the transfer asset is equal to the amount corresponding to the at least one expense asset; and an execution module 1002 configured to, if determining that the verification is successful, deduct the at least one expense asset from the transferor account, and add the transfer asset to the transferee account using the smart contract.

Figure 11:
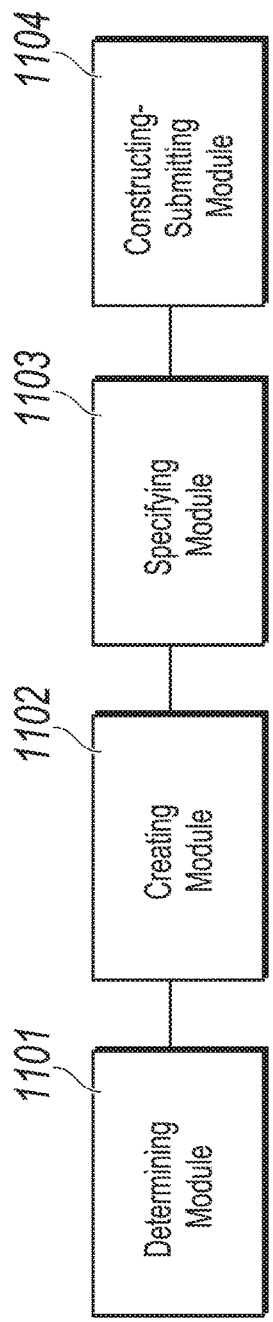
FIG. 11 is a schematic block diagram illustrating a transferring apparatus based on a blockchain smart contract according to an embodiment of the present disclosure.

FIG. 11 is a schematic block diagram illustrating a transferring apparatus based on a blockchain smart contract according to an embodiment of the present disclosure. A smart contract is deployed in the blockchain network. The smart contract is used to manage assets owned by each account and to implement transfers between accounts. For any asset, the asset contains an encrypted amount E (v), and the encrypted amount is obtained by encrypting an amount v corresponding to the asset with a public key of the account that owns the asset.

The transferring apparatus is a transferor client logged in with a transferor account, and the transferring apparatus includes: a determining module 1101 configured to determine a transferee account and at least one expense asset; a creating module 1102 configured to create a transfer asset based on an amount corresponding to the at least one expense asset, wherein the encrypted amount contained in the transfer asset is obtained by encrypting the amount corresponding to the transfer asset with the public key of the transferee account; a specifying module 1103 configured to specify N other transferee accounts, and create N other transfer assets that correspond to the N other transferee accounts in a one-to-one manner, wherein for each other transfer asset, the encrypted amount contained in the other transfer asset is obtained by encrypting zero with the public key of the corresponding other transferee account; and a constructing-submitting module 1104 configured to construct a transfer transaction and submit the transfer transaction to the blockchain network, wherein the transfer transaction includes an account identifier of the transferee account, the transfer asset, the at least one expense asset, account identifiers of the N other transferee accounts, and the N other transfer assets.

Figure 12:
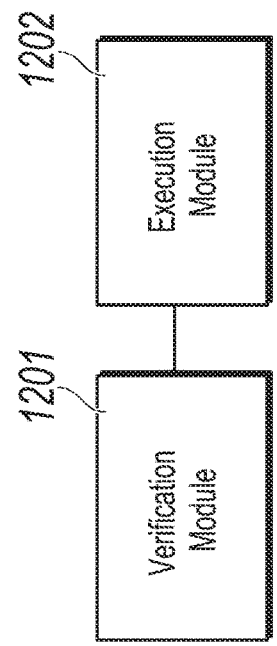
FIG. 12 is a schematic block diagram illustrating a transferring apparatus based on a blockchain smart contract according to an embodiment of the present disclosure.

FIG. 12 is a schematic block diagram illustrating a transferring apparatus based on a blockchain smart contract according to an embodiment of the present disclosure. A smart contract is deployed in the blockchain network. The smart contract is used to manage assets owned by each account and to implement transfers between accounts. For any asset, the asset contains an encrypted amount E (v), and the encrypted amount is obtained by encrypting an amount v corresponding to the asset with a public key of the account that owns the asset.

The transferring apparatus is any node in the blockchain network, and the transferring apparatus includes: a verification module 1201 configured to verify the transfer transaction using the smart contract, wherein verifying the transfer transaction includes: determining, based on a homomorphic encryption algorithm, whether the sum of the amount corresponding to the transfer asset and the amount corresponding to the N other transfer assets is equal to the amount corresponding to the at least one expense asset; and an execution module 1202 configured to, if determining that the verification is successful, deduct the at least one expense asset from the transferor account, add the transfer asset to the transferee account, and add corresponding other transfer asset to each other transferee account using the smart contract.

The present disclosure also provides a computer device including at least a memory, a processor, and a computer program stored on the memory and executable on the processor, wherein when the processor executes the program, the function of the method shown in any one of FIGS. 1 to 4 is implemented.

Figure 13:
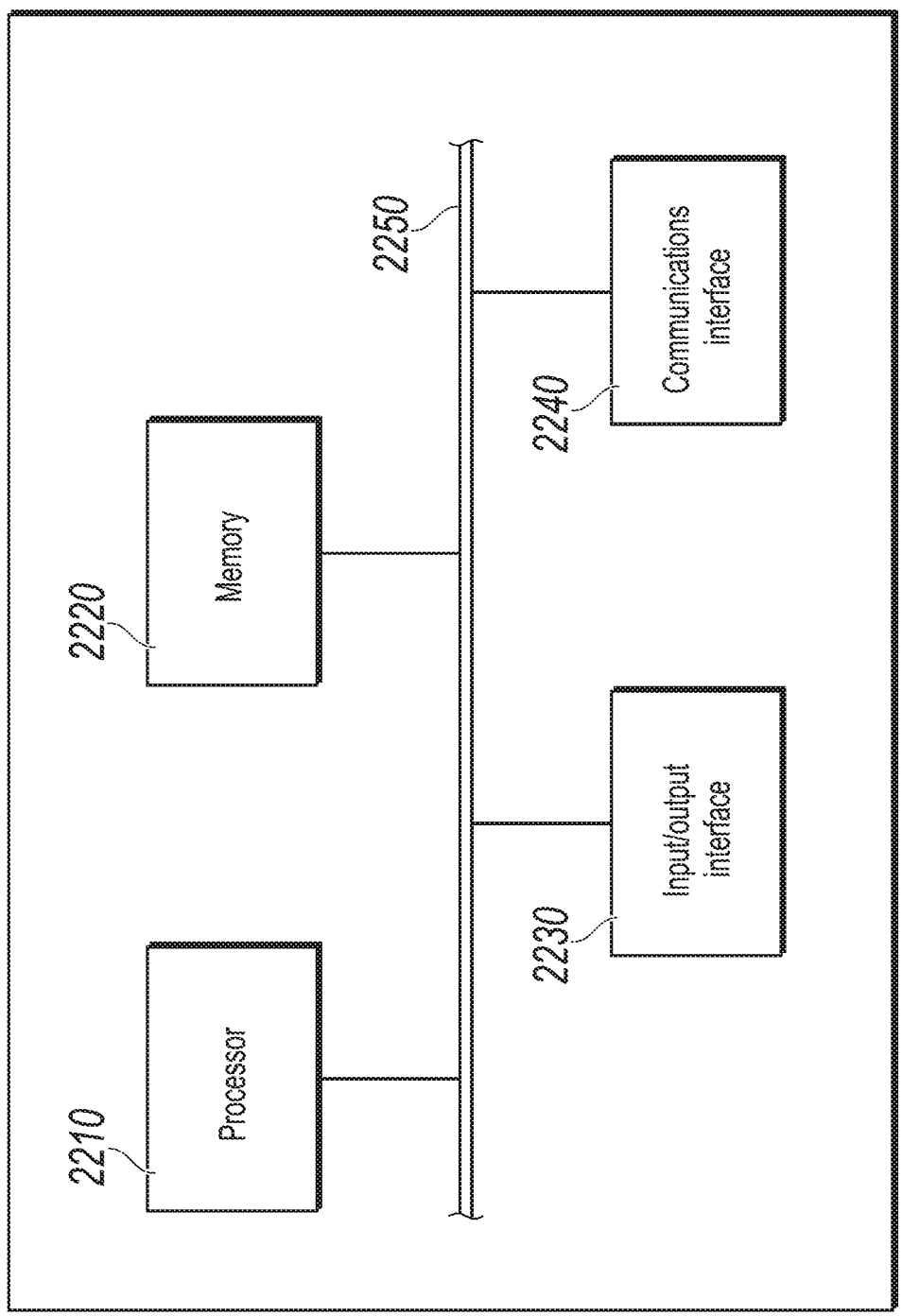
FIG. 13 is a schematic block diagram illustrating a computer device for configuring a method according to an embodiment of the present disclosure.

FIG. 13 is a schematic block diagram illustrating a computer device in further detail according to an embodiment of the present disclosure. The device can include a processor 2210, a memory 2220, an input/output interface 2230, a communication interface 2240, and a bus 2250. The processor 2210, the memory 2220, the input/output interface 2230, and the communication interface 2240 implement a communication connection between each other within the device through a bus 2250.

The processor 2210 can be implemented by a general-purpose CPU (Central Processing Unit), a microprocessor, an Application Specific Integrated Circuit (ASIC), or one or more integrated circuits, and is configured to execute related program to implement the technical solution provided by the embodiment of the present disclosure.

The memory 2220 can be implemented in the form of a ROM (Read Only Memory), a RAM (Random Access Memory), a static storage device, a dynamic storage device, and the like. The memory 2220 can store an operating system and other application programs. When the technical solutions provided in the embodiments of the present disclosure are implemented by software or firmware, related program codes are stored in the memory 2220 and are called and executed by the processor 2210.

The input/output interface 2230 is configured to connect input/output modules to realize information input and output. The input/output module can be configured in the device as a component (not shown in the figure), or it can be externally connected to the device to provide corresponding functions. The input device can include a keyboard, a mouse, a touch screen, a microphone, various sensors, etc., and the output device can include a display, a speaker, a vibrator, and an indicator light.

The communication interface 2240 is configured to connect a communication module (not shown in the figure) to implement communication interaction between the device and other devices. The communication module can implement communication through wired methods (such as USB, network cable, etc.), and can also implement communication through wireless methods (such as a mobile network, WIFI, Bluetooth, etc.).

The bus 2250 includes a path for transmitting information between various components of the device, such as the processor 2210, the memory 2220, the input/output interface 2230, and the communication interface 2240.

It should be noted that, although the above device only shows the processor 2210, the memory 2220, the input/output interface 2230, the communication interface 2240, and the bus 2250, in the specific embodiment process, the device can also include the other necessary components. In addition, those skilled in the art can understand that the foregoing device can also include only components necessary to implement the solutions of the embodiments of the present disclosure, and does not necessarily include all the components shown in the drawings.

An embodiment of the present disclosure also provides a computer-readable storage medium on which a computer program is stored, and when the program is executed by a processor, the functions of any of the methods shown in FIGS. 1 to 4 are implemented.

Computer-readable media includes permanent and non-persistent, removable and non-removable media. Information storage can be accomplished by any method or technology. Information can be computer-readable instructions, data structures, modules of a program, or other data. Examples of computer storage media include, but are not limited to, phase change memory (PRAM), static random access memory (SRAM), dynamic random access memory (DRAM), other types of random access memory (RAM), and read-only memory (ROM), electrically erasable programmable read-only memory (EEPROM), flash memory or other memory technology, read-only disc read-only memory (CD-ROM), digital versatile disc (DVD) or other optical storage, magnetic tape cartridges, magnetic tape storage or other magnetic storage devices or any other non-transmitting medium which can be used to store information that can be accessed by a computing device. As defined herein, computer-readable media does not include temporary computer-readable media (transitory media), such as modulated data signals and carrier waves.

It can be known from the description of the foregoing embodiments that those skilled in the art can clearly understand that the embodiments of the present disclosure can be implemented by means of software plus a necessary universal hardware platform. Based on such an understanding, the technical solution of the embodiments of the present disclosure can be embodied in the form of a software product that is essentially or contributes to the existing technology. The computer software product can be stored in a storage medium such as ROM/RAM, magnetic disks, optical disks, and the like which includes instructions for causing a computer device (which can be a personal computer, a server, or a network device, etc.) to execute the methods described in the various embodiments or portions of the embodiments of the present disclosure.

The system, method, module, or unit described in the previous embodiments can be implemented by a computer chip or entity, or can be implemented by using a product with a certain function. A typical implementation device is a computer, and the specific form of the computer can be a personal computer, a laptop computer, a cellular phone, a camera phone, a smart phone, a personal digital assistant, a media player, a navigation device, an email sending and receiving device, a game console, a tablet computer, a wearable device, or a combination of any of these devices.

Each embodiment in the present disclosure is described in a progressive manner, and the same or similar parts between the various embodiments can be referred to each other. Each embodiment focuses on the differences from other embodiments. In particular, as for the apparatus and device embodiments, since they are basically similar to the method embodiments, they are described relatively briefly, and for the relevant parts, reference can be made to the description of the method embodiments. The method embodiments described above are only schematic, and the modules described as separate components can or cannot be physically separated. When implementing the solutions of the embodiments of the present disclosure, the functions of each module can be implemented in the same software or multiple software and/or hardware. Some or all of the modules can also be selected according to actual needs to achieve the objective of the solution of this embodiment. Those of ordinary skill in the art can understand and implement without creative efforts.

The above are some the embodiments of the present disclosure. It should be noted that for those of ordinary skill in the art, without departing from the principles of the embodiments of the present disclosure, several improvements and modifications can be made. Such improvement and modifications should also be regarded as within the protection scope of the embodiments of the present disclosure.

What is claimed is:

1. A method comprising:
    determining, by a transferor client device, a transferee account, a transfer amount, and at least one expense asset of a transferor account, wherein the at least one expense asset includes a total expense amount that is greater than the transfer amount;
    encrypting, by the transferor client device, the transfer amount with a public key of the transferee account, thereby generating an encrypted transfer amount;
    creating, by the transferor client device, a transfer asset that includes the encrypted transfer amount;
    encrypting, by the transferor client device, a change amount that equals a difference between the total expense amount and the transfer amount, with a public key of the transferor account, thereby generating an encrypted change amount;
    creating, by the transferor client device, a change asset that includes the encrypted change amount;
    specifying, by the transferor client device, N deceptive transferee accounts;
    creating, by the transferor client device, N deceptive transfer assets that correspond to the N deceptive transferee accounts in a one-to-one manner, wherein each deceptive transfer asset includes an encrypted amount that has been obtained by encrypting zero with a public key of the corresponding deceptive transferee account;
    submitting, by the transferor client device, a transfer transaction to a blockchain network, the transfer transaction including an account identifier of the transferee account, the transfer asset, the change asset, the at least one expense asset, account identifiers of the N deceptive transferee accounts, and the N deceptive transfer assets;
    verifying the transfer transaction, by the blockchain network and through a smart contract deployed in the blockchain network, the verifying comprising using a homomorphic encryption algorithm to determine that a sum of the transfer amount, the change amount, and amounts corresponding to the N deceptive transfer assets is equal to the amount corresponding to the at least one expense asset, without obtaining specific values of the transfer amount, the change amount, and the amounts corresponding to the N deceptive transfer assets; and
    in response to determining, by the blockchain network, that the sum is equal to the amount corresponding to the at least one expense asset:
        deducting the at least one expense asset from the transferor account, through the smart contract;
        adding the change asset to the transferor account, through the smart contract;
        adding the transfer asset to the transferee account, through the smart contract; and
        adding corresponding deceptive transfer asset to each deceptive transferee account, through the smart contract.

2. The method according to claim 1, wherein the at least one expense asset, the change asset, and the transfer asset each include a Pedersen commitment parameter $g^v h^r$ and an encrypted random number E (r) obtained by encrypting a random number r; and
    wherein determining that the sum of the transfer amount, the change amount, and amounts corresponding to the N deceptive transfer assets is equal to the amount corresponding to the at least one expense asset is based on a Pedersen commitment parameter included in the transfer asset, a Pedersen commitment parameter included in the change asset, a Pedersen commitment parameter included in the at least one expense asset, and a Pedersen commitment parameter included in the N deceptive transfer assets.

3. The method according to claim 1, wherein the transfer transaction further comprises a range proof; and
    verifying the transfer transaction further comprises determining, through the smart contract, that neither the transfer amount, nor the change amount, nor any amounts corresponding to the N deceptive transfer assets is smaller than zero according to the range proof.

4. The method according to claim 1, wherein verifying the transfer transaction further comprises:
    through the smart contract, determining whether the at least one expense asset exists in assets owned by the transferor account.

5. The method according to claim 1, wherein a given expense asset includes a first state parameter indicating whether the given expense asset has been spent or not spent; and
    wherein verifying the transfer transaction further comprises:
        for each expense asset included in the transfer transaction, determining, using the smart contract, based on the first state parameter included in the expense asset, that the expense asset has been spent; and
        in response to determining that the expense asset has been spent, modifying the first state parameter included in the expense asset to indicate that the expense asset has been spent.

6. The method according to claim 1, wherein a given expense asset includes a second state parameter indicating a presence or absence of the expense asset; and
    wherein verifying the transfer transaction further comprises:
        for each expense asset included in the transfer transaction, using the smart contract, determining whether the expense asset exists based on the second state parameter included in the expense asset.

7. A computer-implemented system, comprising:
    one or more computers; and
    one or more computer memory devices interoperably coupled with the one or more computers and having tangible, non-transitory, machine-readable media storing one or more instructions that, when executed by the one or more computers, perform operations comprising:
        determining, by a transferor client device, a transferee account, a transfer amount, and at least one expense asset of a transferor account, wherein the at least one expense asset includes a total expense amount that is greater than the transfer amount;

encrypting, by the transferor client device, the transfer amount with a public key of the transferee account, thereby generating an encrypted transfer amount;

creating, by the transferor client device, a transfer asset that includes the encrypted transfer amount;

encrypting, by the transferor client device, a change amount that equals a difference between the total expense amount and the transfer amount, with a public key of the transferor account, thereby generating an encrypted change amount;

creating, by the transferor client device, a change asset that includes the encrypted change amount;

specifying, by the transferor client device, N deceptive transferee accounts;

creating, by the transferor client device, N deceptive transfer assets that correspond to the N deceptive transferee accounts in a one-to-one manner, wherein each deceptive transfer asset includes an encrypted amount that has been obtained by encrypting zero with a public key of the corresponding deceptive transferee account;

submitting, by the transferor client device, a transfer transaction to a blockchain network, the transfer transaction including an account identifier of the transferee account, the transfer asset, the change asset, the at least one expense asset, account identifiers of the N deceptive transferee accounts, and the N deceptive transfer assets;

verifying the transfer transaction, by the blockchain network and through a smart contract deployed in the blockchain network, the verifying comprising using a homomorphic encryption algorithm to determine that a sum of the transfer amount, the change amount, and amounts corresponding to the N deceptive transfer assets is equal to the amount corresponding to the at least one expense asset, without obtaining specific values of the transfer amount, the change amount, and the amounts corresponding to the N deceptive transfer assets; and in response to determining, by the blockchain network, that the sum is equal to the amount corresponding to the at least one expense asset:
  deducting the at least one expense asset from the transferor account, through the smart contract;
  adding the change asset to the transferor account, through the smart contract;
  adding the transfer asset to the transferee account, through the smart contract; and
  adding corresponding deceptive transfer asset to each deceptive transferee account, through the smart contract.

8. The system according to claim 7, wherein the at least one expense asset, the change asset, and the transfer asset each include a Pedersen commitment parameter g'h'' and an encrypted random number E (r) obtained by encrypting a random number r; and
  wherein determining that the sum of the transfer amount, the change amount, and amounts corresponding to the N deceptive transfer assets is equal to the amount corresponding to the at least one expense asset is based on a Pedersen commitment parameter included in the transfer asset, a Pedersen commitment parameter included in the change asset, a Pedersen commitment parameter included in the at least one expense asset, and a Pedersen commitment parameter included in the N deceptive transfer assets.

9. The system according to claim 7, wherein the transfer transaction further comprises a range proof; and
  verifying the transfer transaction further comprises determining, through the smart contract, that neither the transfer amount, nor the change amount, nor any amounts corresponding to the N deceptive transfer assets is smaller than zero according to the range proof.

10. The system according to claim 7, wherein verifying the transfer transaction further comprises:
  through the smart contract, determining whether the at least one expense asset exists in assets owned by the transferor account.

11. The system according to claim 7, wherein a given expense asset includes a first state parameter indicating whether the given expense asset has been spent or not spent; and
  wherein verifying the transfer transaction further comprises:
    for each expense asset included in the transfer transaction, determining, using the smart contract, based on the first state parameter included in the expense asset, that the expense asset has been spent; and
    in response to determining that the expense asset has been spent, modifying the first state parameter included in the expense asset to indicate that the expense asset has been spent.

12. The system according to claim 7, wherein a given expense asset includes a second state parameter indicating a presence or absence of the expense asset; and
  wherein verifying the transfer transaction further comprises:
    for each expense asset included in the transfer transaction, using the smart contract, determining whether the expense asset exists based on the second state parameter included in the expense asset.

13. A non-transitory, computer-readable medium storing one or more instructions executable by a computer system to perform operations comprising:
  determining, by a transferor client device, a transferee account, a transfer amount, and at least one expense asset of a transferor account, wherein the at least one expense asset includes a total expense amount that is greater than the transfer amount;
  encrypting, by the transferor client device, the transfer amount with a public key of the transferee account, thereby generating an encrypted transfer amount;
  creating, by the transferor client device, a transfer asset that includes the encrypted transfer amount;
  encrypting, by the transferor client device, a change amount that equals a difference between the total expense amount and the transfer amount, with a public key of the transferor account, thereby generating an encrypted change amount;
  creating, by the transferor client device, a change asset that includes the encrypted change amount;
  specifying, by the transferor client device, N deceptive transferee accounts;
  creating, by the transferor client device, N deceptive transfer assets that correspond to the N deceptive transferee accounts in a one-to-one manner, wherein each deceptive transfer asset includes an encrypted amount that has been obtained by encrypting zero with a public key of the corresponding deceptive transferee account;
  submitting, by the transferor client device, a transfer transaction to a blockchain network, the transfer transaction including an account identifier of the transferee account, the transfer asset, the change asset, the at least one expense asset, account identifiers of the N deceptive transferee accounts, and the N deceptive transfer assets;

verifying the transfer transaction, by the blockchain network and through a smart contract deployed in the blockchain network, the verifying comprising using a homomorphic encryption algorithm to determine that a sum of the transfer amount, the change amount, and amounts corresponding to the N deceptive transfer assets is equal to the amount corresponding to the at least one expense asset, without obtaining specific values of the transfer amount, the change amount, and the amounts corresponding to the N deceptive transfer assets; and in response to determining, by the blockchain network, that the sum is equal to the amount corresponding to the at least one expense asset:
  deducting the at least one expense asset from the transferor account, through the smart contract;
  adding the change asset to the transferor account, through the smart contract;
  adding the transfer asset to the transferee account, through the smart contract; and
  adding corresponding deceptive transfer asset to each deceptive transferee account, through the smart contract.

14. The computer-readable medium according to claim 13, wherein the at least one expense asset, the change asset, and the transfer asset each include a Pedersen commitment parameter $g^v h^r$ and an encrypted random number $E(r)$ obtained by encrypting a random number r; and
  wherein determining that the sum of the transfer amount, the change amount, and amounts corresponding to the N deceptive transfer assets is equal to the amount corresponding to the at least one expense asset is based on a Pedersen commitment parameter included in the transfer asset, a Pedersen commitment parameter included in the change asset, a Pedersen commitment parameter included in the at least one expense asset, and a Pedersen commitment parameter included in the N deceptive transfer assets.

15. The computer-readable medium according to claim 13, wherein the transfer transaction further comprises a range proof; and
  verifying the transfer transaction further comprises determining, through the smart contract, that neither the transfer amount, nor the change amount, nor any amounts corresponding to the N deceptive transfer assets is smaller than zero according to the range proof.

16. The computer-readable medium according to claim 13, wherein verifying the transfer transaction further comprises:
  through the smart contract, determining whether the at least one expense asset exists in assets owned by the transferor account.

17. The computer-readable medium according to claim 13, wherein a given expense asset includes a first state parameter indicating whether the given expense asset has been spent or not spent; and
  wherein verifying the transfer transaction further comprises:
    for each expense asset included in the transfer transaction, determining, using the smart contract, based on the first state parameter included in the expense asset, that the expense asset has been spent; and
    in response to determining that the expense asset has been spent, modifying the first state parameter included in the expense asset to indicate that the expense asset has been spent.

18. The computer-readable medium according to claim 13, wherein a given expense asset includes a second state parameter indicating a presence or absence of the expense asset; and
  wherein verifying the transfer transaction further comprises:
    for each expense asset included in the transfer transaction, using the smart contract, determining whether the expense asset exists based on the second state parameter included in the expense asset.

* * * * *